(12) United States Patent
May

(10) Patent No.: US 10,023,428 B2
(45) Date of Patent: Jul. 17, 2018

(54) ELEVATOR BRAKE FORCE AND DISTANCE SENSOR

(71) Applicant: Inventio AG, Hergiswil (CH)

(72) Inventor: Lutz May, Berg (DE)

(73) Assignee: INVENTIO AG, Hergiswil (CH)

( * ) Notice: Subject to any disclaimer, the term of this patent is extended or adjusted under 35 U.S.C. 154(b) by 93 days.

(21) Appl. No.: 14/898,770

(22) PCT Filed: Feb. 13, 2014

(86) PCT No.: PCT/EP2014/052783
§ 371 (c)(1),
(2) Date: Dec. 16, 2015

(87) PCT Pub. No.: WO2014/202236
PCT Pub. Date: Dec. 24, 2014

(65) Prior Publication Data
US 2016/0137455 A1    May 19, 2016

(30) Foreign Application Priority Data

Jun. 21, 2013  (EP) .................................... 13173284

(51) Int. Cl.
| F16D 66/02 | (2006.01) |
| B66B 5/00 | (2006.01) |
| G01B 7/02 | (2006.01) |
| G01L 1/12 | (2006.01) |
| F16D 63/00 | (2006.01) |
| B66B 1/36 | (2006.01) |

(52) U.S. Cl.
CPC ............ B66B 5/0031 (2013.01); B66B 1/365 (2013.01); B66B 5/0025 (2013.01); F16D 63/008 (2013.01); F16D 66/027 (2013.01); G01B 7/023 (2013.01); G01L 1/122 (2013.01); G01L 1/125 (2013.01)

(58) Field of Classification Search
CPC ........ F16D 66/00; F16D 66/02; F16D 66/026; F16D 66/028; F16D 66/027; F16D 66/024; F16D 2300/18; G01L 1/122; G01L 1/125; B66B 5/18; G01B 7/023
USPC ........................................................ 188/1.111
See application file for complete search history.

(56) References Cited

U.S. PATENT DOCUMENTS

| 3,662,861 | A | * | 5/1972 | White | H04B 3/60 187/391 |
| 4,004,269 | A | * | 1/1977 | Arai | F16D 66/022 188/1.11 L |
| 4,685,540 | A | * | 8/1987 | Rath | F16D 66/02 188/1.11 L |
| 5,419,415 | A | * | 5/1995 | Lamb | B66B 5/0006 116/208 |
| 5,492,312 | A | * | 2/1996 | Carlson | F16F 9/535 188/267.2 |

(Continued)

FOREIGN PATENT DOCUMENTS

| WO | 2012101091 A1 | 8/2012 |
| WO | 2012152720 A1 | 11/2012 |

*Primary Examiner* — Anna M Momper
*Assistant Examiner* — Mahbubur Rashid
(74) *Attorney, Agent, or Firm* — William J. Clemens; Shumaker, Loop & Kendrick, LLP

(57) ABSTRACT

Elevator brake system and elevator brake pads having embedded a sensor arrangement so as to detect relevant parameters of an elevator brake system and elevator brake pad.

14 Claims, 5 Drawing Sheets

(56) References Cited

U.S. PATENT DOCUMENTS

| | | | | |
|---|---|---|---|---|
| 5,559,286 A | * | 9/1996 | White | F16D 66/00 340/454 |
| 5,582,275 A | * | 12/1996 | Arnold | H01F 5/00 188/138 |
| 5,637,794 A | * | 6/1997 | Hanisko | F16D 66/026 340/453 |
| 5,791,442 A | * | 8/1998 | Arnold | H01F 5/00 188/138 |
| 5,909,171 A | * | 6/1999 | Kyrtsos | F16D 66/00 116/208 |
| 6,236,310 B1 | * | 5/2001 | Kramer | F16D 66/00 188/1.11 L |
| 6,360,850 B1 | * | 3/2002 | Odisho | F16D 66/024 188/1.11 L |
| 6,450,300 B1 | * | 9/2002 | Kramer | F16D 66/026 188/1.11 L |

\* cited by examiner

ELEVATOR BRAKE FORCE AND DISTANCE SENSOR

FIELD

The present invention relates to an elevator brake and an elevator brake pad, and in particular to an elevator brake and an elevator brake pad allowing to determine substantial parameters of an elevator brake and elevator brake pad condition.

BACKGROUND

For a user of an elevator brake system it is eminent to know the status of the elevator brake system, how effectively it is operating right now, and when maintenance is required. In other words it is important for the user to rely on the function and performance of the elevator brake system. To monitor an elevator brake system a number of different physical parameters need to be detected, measured, processed, and analyzed. A design and built-up of such a sensor system using common sensing technologies will be reasonably complex and large in volume and may also be cost intensive. One important physical parameter of an elevator brake system is the actually applied elevator brake force, that is the mechanical force with which the elevator brake pads are "pressed" against the elevator brake disk or the elevator brake drum. But also the remaining lifetime, the geometry of the elevator brake pad and elevator brake disk/drum etc. may be relevant parameters.

SUMMARY

The present invention provides an improved elevator brake, and improved elevator brake pads allowing a reliable analysis of the elevator brake condition and an elevator brake pad condition during operation.

According to an exemplary embodiment there is provided an elevator brake comprising a chassis structure, a moving structure being movable over the chassis structure, a first elevator brake element having a first friction surface, a second elevator brake element having a second friction surface, and a controlling and evaluation unit, wherein one of the first elevator brake element and the second elevator brake element is movably mounted to the chassis structure and the other of the first elevator brake element and the second elevator brake element is mounted to the moving structure, wherein the first elevator brake element and the second elevator brake element are arranged to be forced toward each other with the first friction surface toward the second friction surface, wherein at least one of the first elevator brake element and the second elevator brake element comprises a wearing layer having the friction surface, a magnetic field generating arrangement, and a magnetic field sensing arrangement, wherein the controlling and evaluating unit is adapted to drive the magnetic field generating arrangement so as to generate a magnetic flux in the wearing layer, and the controlling and evaluating unit is adapted to determine a condition of the elevator brake, in particular of the wearing layer based on a signal received from the magnetic field sensing arrangement.

Thus, the condition of the elevator brake and the elevator brake pads, respectively, may be analyzed. One elevator brake element, e.g. an elevator brake pad may be movably mounted to the chassis structure and may be forced toward the other elevator brake element being mounted to the moving part. The other elevator brake element may be an elevator brake disk or drum, whereas the one elevator brake element may be an elevator brake pad for an elevator brake disk and drum, respectively. The moving part may conduct a rotational movement or a linear movement or a combination thereof. Condition of the elevator brake, and in particular of the wearing layer may include an applied force between the friction surfaces, a distance between the friction surfaces, a movement of the elevator brake elements with respect to each other, an abrasion of the wearing layer, but is not limited thereto. Forces between the elevator brake elements, at least one of which may be an elevator brake pad, as well as the geometry of the moving parts and the fixed parts of the elevator brake with respect to each other may influence the magnetic field and/or the magnetic flux generated by the magnetic field generating device. The changes in the magnetic field may be used to analyze the applied force to the elevator brake or to analyze the distance between for example an elevator brake pad and an elevator brake disk or drum. However, also movement of the elements with respect to each other and change of geometry, e.g. by abrasion, may be detected.

According to an exemplary embodiment the one of the first element and the second element comprises a flux concentrator and the magnetic field generating arrangement comprises a magnetic field generating coil arrangement wound around the flux concentrator, and wherein the controlling unit is adapted to drive the magnetic field generating coil arrangement so as to generate a magnetic flux in the flux concentrator.

Thus, the flux may be concentrated and the magnetic field may be well defined for measurement purposes. In particular the magnetic field strength may be concentrated to locations being relevant for the measuring process. The magnetic field generator in form of a coil wound around the flux concentrator allows generating an alternating flux.

According to an exemplary embodiment the magnetic field sensing arrangement comprises a sensing coil arrangement wound around the flux concentrator.

Thus, a simple and effective build up may be provided. The flux concentrator together with the magnetic field generating coil and the sensing coil arrangement may be pre-manufactured before e.g. embedding the same into the wearing layer. It should be noted that instead of a magnetic field generating coil also a permanent magnet may be used being in line with the flux concentrator. This however only provides a static magnetic field. Regardless of the type of magnetic field generating elements, and also regardless whether or not providing a flux concentrator, other types of magnetic field sensors may be used, like for example a Hall effect sensor, a MR sensor or a GMR sensor.

According to an exemplary embodiment at least a part of the flux concentrator is arranged within the wearing layer, wherein at least one pole face of the flux concentrator is flush with a friction surface of the one of the first elevator brake element and the second elevator brake element, wherein the friction surface of the other of the first element and the second element comprises a ferromagnetic surface facing at least one pole face of the flux concentrator.

Thus, the distance between the pole face, which corresponds to the friction surface of the wearing layer, and the other elevator brake element, e.g. an elevator brake disk or an elevator brake drum, can be determined as well as the force acting between the first elevator brake element and the second elevator brake element, in particular between the first and second friction surface. In case the elevator brake is open, i.e. the elevator brake pad with the wearing layer is distant from the elevator brake disk, the flux concentrator is not in contact with the ferromagnetic surface of the elevator brake disk/drum, so that the magnetic properties of the arrangement flux concentrator and ferromagnetic surface of the other elevator brake element is poor. However in case the elevator brake is closed, the magnetic properties are better, as the flux concentrator is in contact with the ferromagnetic surface of the opposed element. Thus the distance between the pole face flush with the friction surface of the wearing layer and the ferromagnetic surface can be determined, based on the varying flux.

According to an exemplary embodiment the controlling and evaluating unit is adapted to determine a force, in particular a mechanical force perpendicularly acting in relation to and between the friction surface of one of the first element and the second element and the friction surface of the other of the first element and the second element based on a signal strength received from the magnetic field sensing arrangement.

The magnetic properties of the magnetic circuit of the flux concentrator and the ferromagnetic surface further improve when increasing the force between the pole faces and the ferromagnetic surface, i.e. between the first and second elevator brake element. This aspect may be used for determining the force acting on the elevator brake elements based on the flux.

According to an exemplary embodiment at least a part of the flux concentrator is arranged within the wearing layer, wherein at least one pole face of the flux concentrator is distant to a friction surface of the wearing layer, at least unless until arriving at the maximum wear of the wearing layer.

Thus, when the elevator brake is activated, i.e. the friction surfaces are forced toward each other, the distance between the pole face and the other elevator brake element's friction surface, e.g. an elevator brake disk or an elevator brake drum, can be determined. This distance may correspond to the maximum wear of the wear layer, so that the determined distance at the same time is the remaining wear. Thus the sensor may be used to monitor the lifetime of the elevator brake pad.

According to an exemplary embodiment there is provided an elevator brake comprising a chassis structure, a moving structure being movable over the chassis structure, a first elevator brake element having a first friction surface, a second elevator brake element having a second friction surface, and a controlling and evaluation unit, wherein one of the first elevator brake element and the second elevator brake element is movably mounted to the chassis structure and the other of the first elevator brake element and the second elevator brake element is mounted to the moving structure, wherein the first elevator brake element and the second elevator brake element are arranged to be forced toward each other with the first friction surface and the second friction surface, wherein at least one of the first elevator brake element and the second elevator brake element comprises a wearing layer having the friction surface, a flux concentrator at least partially arranged or embedded within the wearing layer, a magnetic field generating coil arrangement wound around the flux concentrator, and a magnetic field sensing coil arrangement wound around the flux concentrator, wherein at least one pole face of the flux concentrator flushes with the respective friction surface of the one of the first elevator brake element and the second elevator brake element, wherein at least the other of the first elevator brake element and the second elevator brake element comprises a ferromagnetic surface or surface layer as the friction surface facing the at least one pole face of the flux concentrator, wherein the controlling and evaluating unit is adapted to drive the magnetic field generating coil so as to generate a magnetic flux in the flux concentrator, wherein the controlling and evaluating unit is adapted to determine a force between the wearing layer of the one, and the friction surface of the other of the first element and the second element based on a signal received from the magnetic field sensing arrangement.

Thus, it is possible to determine the distance between the pole face of the flux concentrator, which is at the same level as the friction surface of the wearing layer, and the friction surface of the other elevator brake element. It should be emphasized that the first friction surface and the second friction surface in practice are of different materials and that only one of the friction surfaces, i.e. that of the wearing layer, is adapted to have a wear or abrasion. The other friction surface, e.g. a metal elevator brake disk or drum has substantially no wear or abrasion. The other friction surface or surface layer, e.g. at the elevator brake disk or the elevator brake drum may be of a ferromagnetic material so as to serve not only as the friction surface or counter elevator brake element, but also as the influencing element for influencing the flux and/or the magnetic field generated in the wearing layer.

According to an exemplary embodiment at least one of the first elevator brake element and the second elevator brake element comprises a second flux concentrator being at least partially arranged within the wearing layer, a second magnetic field generating coil arrangement wound around the second flux concentrator, a second magnetic field sensing coil arrangement wound around the second flux concentrator, wherein at least one pole face of the second flux concentrator is distant to the respective friction surface of the one of the first element and the second element, wherein the other of the first element and the second element comprises a ferromagnetic surface as friction surface facing at least one pole face of the second flux concentrator, wherein the controlling and evaluating unit is adapted to drive the second magnetic field generating coil arrangement so as to generate a magnetic flux in the second flux concentrator, wherein the controlling and evaluating unit is adapted to determine upon contact of the first friction surface and the second friction surface the distance between the at least one pole face of the second flux concentrator and the friction surface of the other of the first element and the second element based on a signal received from the second magnetic field sensing arrangement.

Thus, it is possible to determine three substantial parameters for the elevator brake. The first flux concentrator allows determining the distance between both friction surfaces in case the elevator brake is not activated, i.e. not closed. In addition the first flux concentrator allows determining the elevator brake force in case the elevator brake is activated, i.e. closed. The second flux concentrator allows determining the thickness of the wear layer and therefore the life time of the elevator brake element or elevator brake pad in case the elevator brake is activated, i.e. closed.

According to an exemplary embodiment the flux concentrator is a yoke having a first leg and a second leg, wherein the sensing coil arrangement comprises a first feedback coil wound around the first leg of the flux concentrator and a second feedback coil wound around the second leg of the flux concentrator.

Thus, the flux concentrator may be formed as a yoke and may have two pole faces opposing the other friction surface. At the same time the two legs of the flux concentrator allow to arrange two sensing coils which may significantly improve the sensing properties of the device. It should be noted that the concentrator in form of a yoke may also have only one sensing coil wound around the concentrator.

According to an exemplary embodiment at least one of a driving wire of the magnetic field generating arrangement and a signal wire of the magnetic field sensing arrangement is arranged within the wearing layer, such that when arriving at a maximum abrasion of the wearing layer, the at least one of a driving wire of the magnetic field generating arrangement and a signal wire of the magnetic field sensing arrangement is interrupted by abrasion or brought into electrical contact with the other friction surface, i.e. the elevator brake disk or elevator brake drum.

Thus, it is possible to detect end of lifetime, by monitoring the operation of the magnetic field generator or the sensor. If it is detected that one of the generator and the sensor does not work any longer, the respective wire was interrupted by abrasion. The monitoring may be handled by the control and evaluating unit. It should be noted that even an electric contact between the wire and the surface of the counter elevator brake element may be detected. The surface of the counter element may be for example of metal, e.g. ferromagnetic metal, as described above. Permanent use of the elevator brake will avoid any corrosion which may be electrically insulating. Thus, the counter surface may be considered as a conductive surface, so that even the contact of one of the driving wire and the signal wire may easily be detected.

According to an exemplary embodiment the flux concentrator is made of a material having an abrasion property, so that the flux concentrator and a material of the wearing layer abrade correspondingly.

Thus, the material of the flux concentrator will not disturb the friction properties between the friction surface of the wearing layer on the one hand and the friction surface of the other elevator brake element on the other hand. In particular the flux concentrator will not affect or destroy the friction surface of the counter elevator brake element, e.g. the elevator brake disk or the elevator brake drum.

According to an exemplary embodiment there is provided an elevator brake pad comprising a wearing layer with a friction surface, a flux concentrator at least partially arranged within or buried in the wearing layer, and a magnetic field generating coil arrangement wound around the flux concentrator, wherein at least one pole face of the flux concentrator flushes with the friction surface, wherein the elevator brake pad is adapted to be used in an elevator brake so as to allow determining a condition of the wearing layer based on a magnetic flux generated in the flux concentrator.

Thus, it is possible to use the elevator brake pad in an elevator brake so as to allow determining a distance between the elevator brake pad and for example an elevator brake disk or an elevator brake drum and also determining a force applied to the elevator brake bad when activating the elevator brake, based on a magnetic flux generated in the flux concentrator. In addition end of lifetime of the elevator brake pad may be detected. It should be noted that also a field sensing arrangement as described above may be embedded in the wearing layer.

According to an exemplary embodiment there is provided an elevator brake pad comprising a wearing layer with a friction surface, a flux concentrator at least partially arranged within the wearing layer, and a magnetic field generating coil arrangement wound around the flux concentrator, wherein at least one pole face of the flux concentrator is distant to the friction surface, wherein the elevator brake pad is adapted to be used in an elevator brake so as to allow determining a condition of the wearing layer based on a magnetic flux generated in the flux concentrator.

Thus, it is possible to use the elevator brake pad in an elevator brake for determining a condition of the wearing layer in form of a remaining wear and lifetime based on a magnetic flux generated in the flux concentrator. It should be noted that also a field sensing arrangement as described above may be embedded in the wearing layer.

According to an exemplary embodiment there is provided an elevator brake pad comprising a wearing layer with a friction surface, a first flux concentrator at least partially arranged within the wearing layer, a first magnetic field generating coil arrangement wound around the first flux concentrator, a second flux concentrator at least partially arranged within the wearing layer, and a second magnetic field generating coil arrangement wound around the second flux concentrator, wherein at least one pole face of the first flux concentrator flushes with the friction surface, wherein at least one pole face of the second flux concentrator is distant to the friction surface, wherein the elevator brake pad is adapted to be used in an elevator brake so as to allow determining a condition of the wearing layer based on a magnetic flux generated in at least one of the first and second the flux concentrators.

Thus, it is possible to use the elevator brake pad in an elevator brake so as to allow by way of the first flux concentrator determining a distance between the elevator brake pad and for example an elevator brake disk or an elevator brake drum and also determining a force applied to the elevator brake bad when activating the elevator brake, based on a magnetic flux generated in the flux concentrator. In addition, it is possible by way of the second flux concentrator to determine a remaining wear and lifetime based on a magnetic flux generated in the flux concentrator. It should be noted that also a field sensing arrangement as described above may be embedded in the wearing layer.

According to an exemplary embodiment the wear layer comprises an element being eminent for determining the wear layer condition, wherein the element eminent for determining the wear layer condition is arranged such that when arriving at a maximum abrasion of the wearing layer, the element eminent for determining the wear layer condition is abraded such that end of lifetime of the elevator brake pad can be detected by failure of determining the condition of the wearing layer.

Thus, it is possible to detect end of lifetime or coming up of end of life time by monitoring the operation of the sensor arrangement. The eminent element may be a drive wire of the generator and/or a signal wire of the field sensor. The wire may be interrupted so that the interruption is indicative for end of lifetime, or the wire may contact the counter surface so that the contact may be detected. The latter allows under particular circumstances a further operation of the measurement, as the wire is not interrupted but only contacted.

It may be seen as a gist of the present invention to provide an elevator brake and an elevator brake pad having included a sensor arrangement allowing easily detecting substantial parameters of the elevator brake.

It should be noted that the above features may also be combined. The combination of the above features may also lead to synergetic effects, even if not explicitly described in detail.

These and other aspects of the present invention will become apparent from and elucidated with reference to the embodiments described hereinafter.

DESCRIPTION OF THE DRAWINGS

Exemplary embodiments of the present invention will be described in the following with reference to the following drawings.

DETAILED DESCRIPTION

Figure 1:
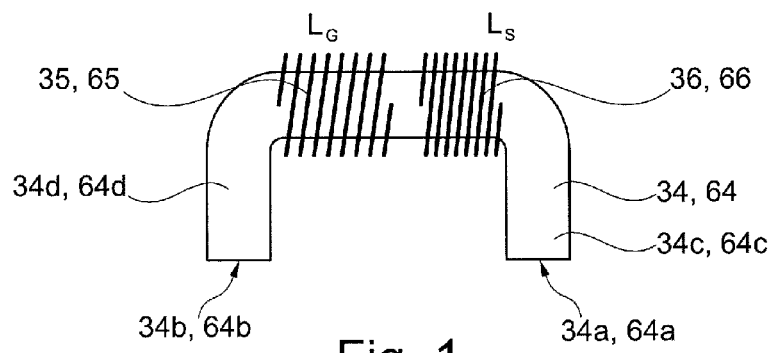
FIG. 1 illustrates a flux concentrator according to an exemplary embodiment having two legs and pole faces and a generator coil and a sensor coil arrangement wound around the concentrator.

The present invention provides a sensor system-design having a sensor embedded in the elevator brake pad itself. According to an exemplary embodiment the one and only sensing module of the sensor system may be embedded inside the elevator brake pad itself. The sensing module may be capable of providing the raw signals required by the sensor system electronics or the controlling and evaluation unit to execute the tasks of detecting and measuring the mechanical forces applied by the sensor device. These forces may result from pressing elevator brake pads onto an elevator brake disk or elevator brake drum, or in general onto a test-object. Thus, it may be confirmed that the elevator brake-pad is actually moving and does not stuck or is blocked in any way when instructed by the elevator brake control system to do so. It is also possible to detect and measure the distance from the front-face or friction surface of the sensing module, e.g. elevator brake pads to the surface of the test-object (this may require that the test-object is tooled from an electric conductive material), and to detect when the elevator brake-pads are worn-out and possibly need to be replaced. Further, it is possible to detect and measure the speed and the direction with which the test-object, e.g. an elevator brake drum or disk is actually moving or rotating.

The here described sensor solution is based on magnetic physics and may require that the elevator brake disk or elevator brake drum, or parts thereof are tooled from material with particular magnetic properties. It should be noted that the test-object, e.g. the elevator brake disk or drum may have magnetic properties as needed for this sensing solution. The test-object, e.g. the elevator brake disk or drum may have ferromagnetic properties in the meaning that a permanent magnet has to be attracted to the test-object. The here described sensing solution will even work when the surface of the test-object is covered under a coat of paint, or is slightly rusty (oxidized), or is covered by a film of oil or other insulating liquid. While for particular embodiments it is advantageous that the main body of the test-object has to be tooled from ferromagnetic material and has to be electrically conductive, the surface of the test-object may not have to be conductive (limits do apply) for magnetic measurements. In particular for measuring the speed of the test-object (elevator brake-disk or elevator brake drum), the test-object may be electrically conductive. Under optimal circumstances, all of the features listed above can be detected and measured from one and the same sensing module. Most of the components used to build the sensing module may be all low-cost, passive and wire wound coils. Therefore, the sensing module may be part of the consumable elevator brake pad and may be replaced when the elevator brake pad has reached its end-of-live stage.

The sensor system can be installed into new and modern elevator brake system as well into elevator brake systems that are many decades of years old. In elevator applications both types of elevator brakes are used: rotating ones and sliding ones (linear moving elevator brakes). For an elevator control system it is paramount to know that the elevator brakes are fully operational and that they will work when instructed to do so. The system may assist the elevator control system to determine, whether—when instructed to do so—the elevator brake pads are moving. If they stick and no longer are able to move in whatever position, then the elevator brakes can no longer be operated by the control system. In addition the system may assist to determine whether the elevator brake pad thickness is sufficient or whether the elevator brake pad is worn-out and needs to be replaced. In addition the system may assist in evaluating, whether the elevator brake pad is in contact with the surface of the test-object, e.g. the elevator brake disk or elevator brake drum. The system may determine with what mechanical force the elevator brake pad is actually pressed against the elevator brake disk or the elevator brake drum surface. The effective mechanical force with which the elevator brake pad is pressed against the elevator brake disk or elevator brake drum surface is a measurement or an indication about how effective the elevator brakes will be in absorbing mechanical energy from the disk or drum. The higher the pressing forces are, the more aggressively the elevator brake pad will absorb the energy from the rotating test-object, e.g. the elevator brake drum/disk. The system may monitor the speed of the test-object, and in what direction the test-object turns or moves, and whether the speed increases or decreases. The speed measurement may be conducted when the sensing module is actually in contact or very close to the test-object. The speed sensing function may be less effective or may not work exactly when the spacing between the sensing module face and the test-object surface exceeds a certain limit. The system may further assist in determining whether the test-object (elevator brake disc, elevator brake drum, elevator brake beam) actually is in motion or is standing still. The system may detect whether the elevator brakes are within the specified operating temperature range or overheating, i.e. outside of the operating temperature range and outside of the range where they work efficiently. The system may also detect whether there is any wire breakage or short circuit inside the sensing module and the sensor electronics, so that the system provides a sensor system diagnostic feature. As the system may assist for a plurality of monitoring aspects, the system may avoid a plurality of single sensors that may result in a relative complex (large in volume) and costly electro and mechanical design.

The sensor system comprises two main parts, the sensing module which may be placed inside the elevator brake pad and therefore may be part of the replaceable elevator brake pad, and the sensor electronics. The sensing module comprises a magnetic field generator unit and a magnetic field sensing unit. The sensor electronics include a controlling and evaluation unit. The sensing module and the sensor electronics are connected with each other, e.g. by a number of electrical wires or wireless. In most cases the elevator brake pad may get very hot when the elevator brakes are used, i.e. are activated. Therefore it is not advisable or it may be even impossible to place the sensor electronics at the same location where the sensing module is. The maximum wire length between the sensing module and the sensing electronics is dependent on several parameters, for example the generator frequency used, anticipated signal interferences, impedance of the connection wires, etc.

According to an exemplary embodiment illustrated in FIG. 1, the sensing module of the elevator brake system or elevator brake pad comprises a flux concentrator 34, 64 and of a number of inductors wound around the flux concentrator. The inductors or coils $L_G$ serve as magnetic field generating arrangement 35, 65 and inductors or coils $L_S$ serve as magnetic field sensing arrangement or sensors 36, 66. It should be noted that the magnetic field sensing arrangement may also be provided by a hall sensor, an MR sensor or a GMR sensor instead of inductors or coils wound around the flux concentrator 34, 64. The flux concentrator 34, 64 in this embodiment has two legs forming the poles of the magnet, a first leg 34c, 64c, and a second leg 34d, 64d. The flux concentrator has two pole faces at the respective ends of the legs, a first pole face 34a, 64a, and a second pole face 34b, 64b.

Figures 2, 3:
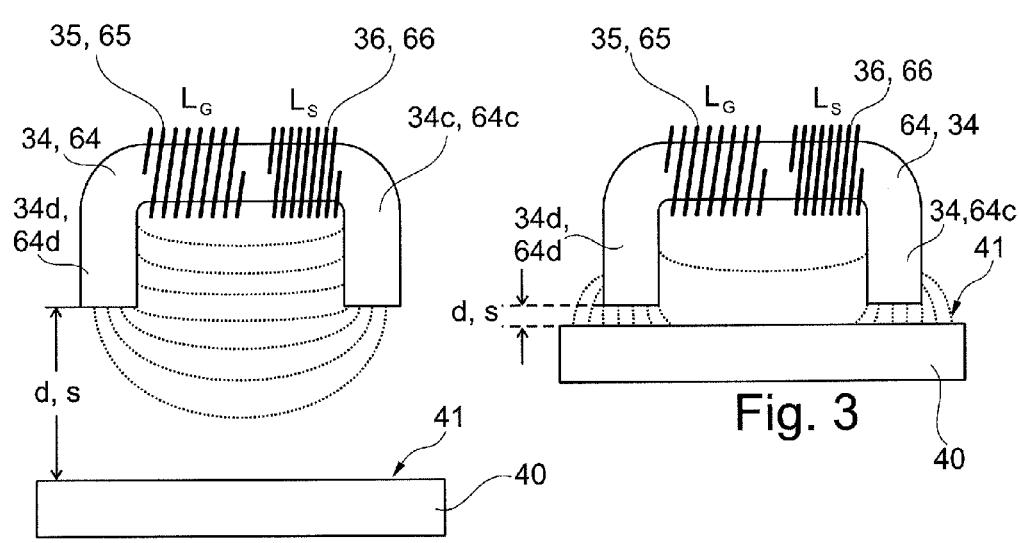
FIG. 2 illustrates the flux concentrator of FIG. 1 with a remote object/test object to detect.
FIG. 3 illustrates the flux concentrator of FIG. 1 with a close object/test object to detect.

FIG. 2 and FIG. 3 illustrate the relation of the flux concentrator and inductors on the one hand, e.g. in the elevator brake pad, and the counterpart thereof as the elevator brake disk or elevator brake drum on the other hand. The flux concentrator is allocated to a first elevator brake element 30, e.g. the elevator brake pad, and a second elevator brake element 40 is allocated to the elevator brake disk or drum. As will be described in the following, one of the first element and the second element is at a fixed construction part 10 of the elevator brake 1, and the other of the first elevator brake element and the second elevator brake element is at a moving part 20, like the elevator brake disk, as will be described later on. In FIGS. 2 and 3 and in the following, the first elevator brake element 30 is allocated to the fixed part 10 of the elevator brake, and the second elevator brake element 40 is allocated to the moving part 20 of the elevator brake. For sake of completeness, this allocation is arbitrary and may be vice versa, e.g. if the elevator brake pad is arranges at a moving or rotating part of the elevator brake, and the elevator brake disk is stationary.

In the embodiment described herein, the basic design of the sensing module is a horse shoe shaped flux concentrator 34, 64 with two inductors (coils) that are placed onto the flux concentrator, a generator coil 35, 65, here coil $L_G$, and a feedback coil 36, 66, here coil $L_S$. For easier explanations of the operational function of the basic sensing module, the two inductors (coils) can also be denoted as primary coil and secondary coil. The two pole-ends 34a, 34b, 64a, 64b of the flux concentrator 34, 64 will face forward, towards the test-object 40, e.g. an elevator brake disk surface 41 as the friction surface.

The secondary coil function can be replaced by an active magnetic field sensor as well. However for a number of reasons that are explained in the following, a passive operating coil provides additional features, like being lower in cost and being operable in a very wide operating temperature range.

When using the sensor as a distance sensor, the signal transfer function between the primary and the secondary coil is dependent on the signal used and that will drive the primary coil 35, 65, and also depends on what material or object will be placed between the two magnetic poles of the flux concentrator 34, 64. In the following it is assumed that the electrical signal for driving the primary coil is an alternating current of a certain frequency.

FIG. 2 illustrates the sensing module and a test object 40, e.g. made of ferromagnetic material, being placed with some distance d, s to each other. In FIG. 3 the test-object 40 is placed much closer to the sensing module and the flux concentrator 34, 64.

When the ferromagnetic object 40 is placed closer to the sensing module or flux concentrator 34, 64, as can be seen in FIG. 3, then the magnetic flux lines generated by the primary coil 35, 65 can travel more easily from one pole end of the flux concentrator 34, 64 to the other pole end of the flux concentrator. This results in a much more effective signal transfer function between the primary coil 35, 65 and the secondary coil 36, 66.

Figure 4:
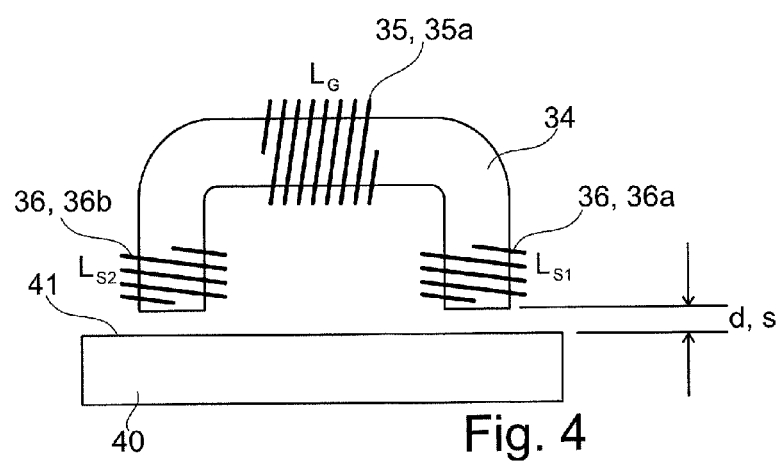
FIG. 4 illustrates the flux concentrator of FIG. 1 with a sensor coil arrangement having two sensing coils.

FIG. 4 illustrates the provision of two sensing coils as secondary coils, a first sensing coil 36a and a second sensing coil 36b, here also denoted as $L_{S1}$ and $L_{S2}$. This will improve the signal transfer function and compensate for unwanted "tilting" between the test-object and the flux concentrator. The dependency of the $L_S$ signal amplitude in relation to the test-object distance can be further improved (increased) when placing the secondary coil nearest to the pole-end of the flux concentrator. For signal symmetry purposes it is even better to split the secondary coil ($L_S$) into two coils ($L_{S1}$ and $L_{S2}$) and place each of the now shorter coils at one end of the flux concentrator. The two individual secondary coils are e.g. connected to each other in series. Incorrect distance reading that may be caused by a potential "tilting" of the test-object in relation to the two pole-ends of the flux concentrator can be now compensated for.

Figure 5:
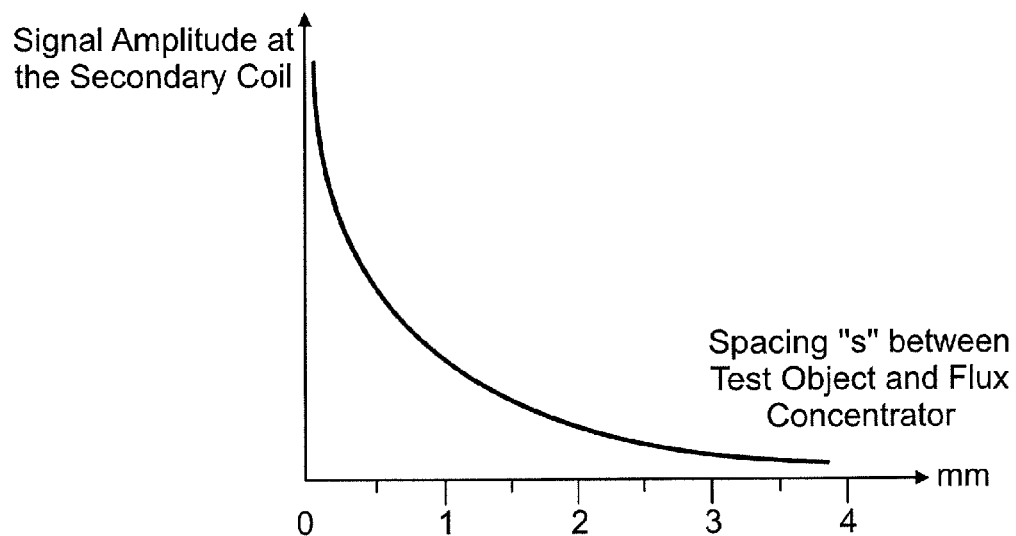
FIG. 5 illustrates a characteristic between sensor signal amplitude and a distance between flux concentrator and test object.

As can be seen in FIG. 5, the signal amplitude at the secondary coil will increase exponentially when the test-object will come closer ("s" stands for Distance) to the poles of the flux concentrator and will be very high when touching both poles. Under the assumption that the electric current (AC) driving the primary coil $L_G$ is kept constant (same value), the AC signal received at the secondary coil ($L_S$) will vary in relation to the distance "s" between a ferromagnetic test-object and the flux concentrator. The smaller the spacing (distance) between the test-object and the flux concentrator, the larger the output signal at the secondary coil will be. This sensing module design as described above is capable of measuring the distance from the flux concentrator to the test-object, in practice the distance between the elevator brake pad and the elevator brake drum/disk.

Figure 6:
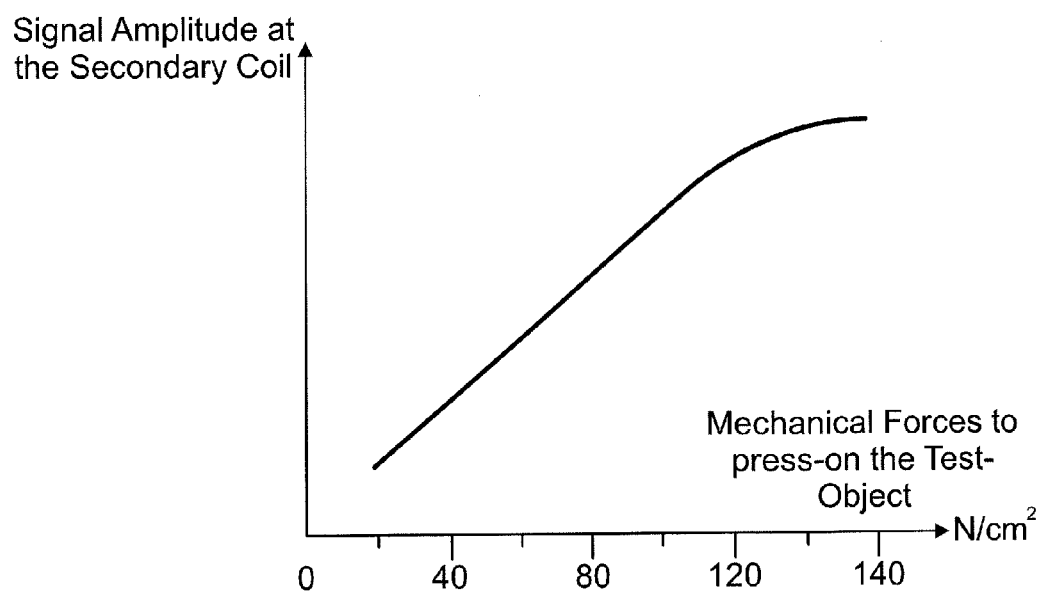
FIG. 6 illustrates a characteristic between sensor signal amplitude and a force applied between flux concentrator and test object.

FIG. 6 illustrates the operation as a mechanical load force sensor. When the test-object 40, e.g. a bar tooled from ferromagnetic material is "just" touching both ends of the flux concentrator, and no mechanical load forces are applied to press or hold together both objects towards each other, then the AC signal amplitude at the output of the secondary coil has reached a very high value. Even if both objects (flux concentrator and test-object) are already touching each other, the signal amplitude at the output of the secondary coil will further increase when applying and increasing the mechanical force with-which both objects are now pressed towards each other. The larger the pressing (or load) forces are, the larger the signal amplitude will be, as can be seen in FIG. 6.

When increasing the mechanical forces that are pressing together the test-object 40 and the two poles of the flux concentrator 34, the signal amplitude at the secondary coil 36 will increase in a near linear faction until the maximum has been reached. The forces needed to reach the maximal magnetic flux transfer depend on several different factors. The figures shown are an example only.

The flux density within the joining places (where the pole faces 34a, 34b of the flux concentrator 34 meet the test-object 40 and its friction surface 41) will continue to increase when the surfaces are pressed together towards each other. However, the rate with which the signal amplitude is increasing is now much less in comparison to when the test object was just about to touch the flux concentrator.

Figure 7:
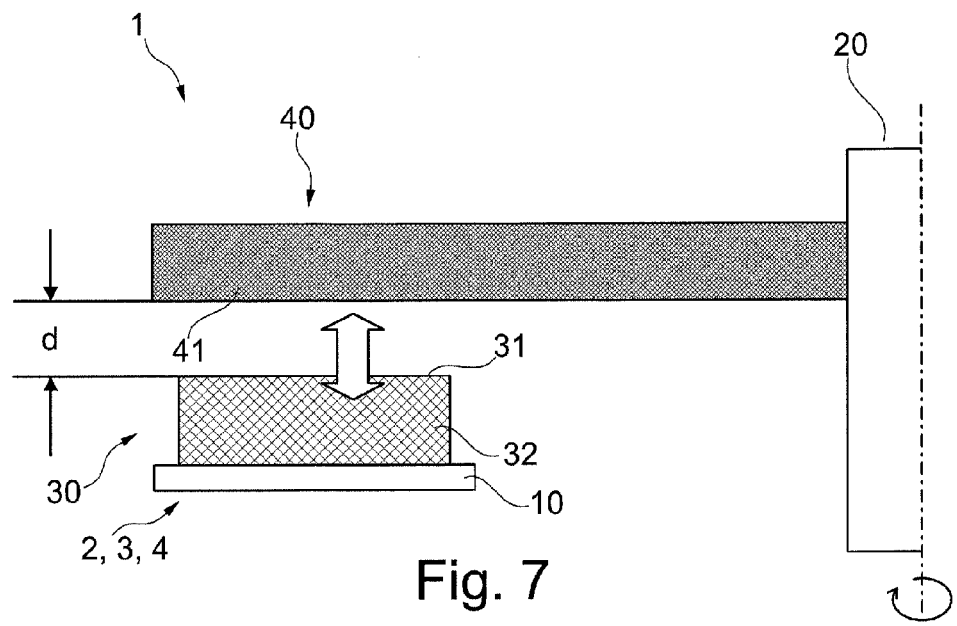
FIG. 7 illustrates an elevator brake arrangement according to an exemplary embodiment.

FIG. 7 illustrates an exemplary sensor system assembly and mounting. In the targeted application (elevator brake system) one part 20 of the elevator brake 1 is moving (or rotating) while the other part 10 is mounted statically to a frame structure that is holding the elevator brake system in place. As the sensing module often is connected to the sensor electronics or controlling and evaluation unit 50 by a number of wires, it is most consequent trying to place the sensing module into the stationary part of the elevator brake system, which may include the elevator brake pad 2, 3, 4. It should be noted that, although not shown, the elevator brake pad 2, 3, 4 may also be located at the moving part, and be connected wireless with respect to signals and driving. By definition, the elevator brake pad, in particular the wearing layer 32 has to be manufactured from a softer material, than the elevator brake disk or the elevator brake drum 40. Therefore the elevator brake pads have a limited lifetime and eventually they need to be replaced when they have been worn down. When new, then the thickness of the elevator brake pad and the wearing layer 32 is the largest, and when worn down the elevator brake pad and wearing layer 32 is very thin. The distance measurement between the elevator brake pad surface 31 and the elevator brake disk (or elevator brake drum) surface 41 has to take into account that the elevator brake pad thickness keeps changing during its normal usage. FIG. 7 illustrates that elevator brake disk 40 is mounted onto a drive shaft. When the drive shaft is rotating, then so does the elevator brake disk 40. The elevator brake pad 2, 3, 4 is mounted onto an elevator brake pad holder and does not rotate, i.e. is stationary. However, the elevator brake pad 2, 3, 4 can be pressed onto the friction surface 41 of the elevator brake disk 40 to perform the elevator brake action. By doing so the spacing distance s will change between the friction surface 31 of the elevator brake pad 2, 3, 4 and the friction surface 41 of the elevator brake disk 40.

Figure 8:
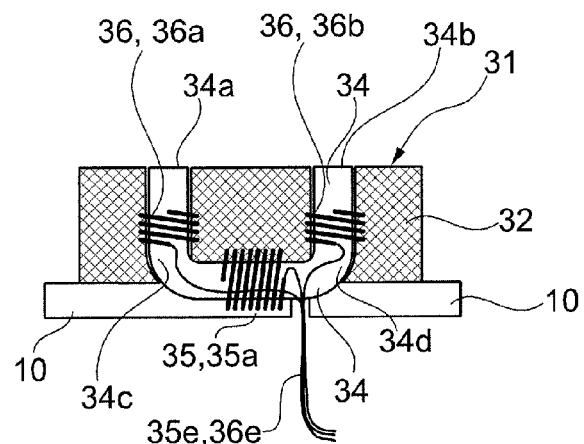
FIG. 8 illustrates an elevator brake pad according to an exemplary embodiment having embedded a flux concentrator and generator and sensor coils wound around.

FIG. 8 illustrates the sensing module being embedded inside the elevator brake pad and with this will move back and forth together with the elevator brake pad. For force measurement it is important that the two pole faces 34a, 34b of the flux concentrator 34 are flush with the working surface or friction surface 31 of the elevator brake pad or wearing layer 32. Thus the elevator brake disk 40 will have contact with the elevator brake pad surface 31 and the flux concentrator 34 simultaneously.

Figures 9, 10, 11:
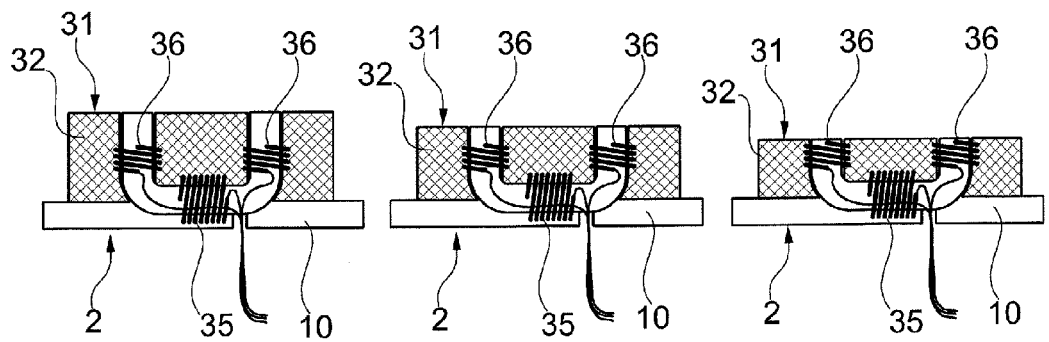
FIG. 9 illustrates the elevator brake pad of FIG. 8 in an unused condition.
FIG. 10 illustrates the elevator brake pad of FIG. 8 in a somewhat used or half lifetime condition.
FIG. 11 illustrates the elevator brake pad of FIG. 8 in an almost fully used or end of lifetime condition.

As can be seen in FIGS. 9, 10 and 11 as the elevator brake is getting used, the elevator brake pad will be worn for every elevator brake action and will become thinner and thinner. For this embodiment it is important that the material chosen for the flux concentrator 34 is soft enough so that it will not damage the surface 41 of the elevator brake disk 40. The chosen flux concentrator material has to be such that the ends of poles/pole faces of the flux concentrator 34 will wear-out at the same rate as the wearing layer 32 of the elevator brake pad itself. The sensing module embedded into the elevator brake pad in this embodiment has been designed in such way that the wire 36e of the secondary coil 36a, 36b will be interrupted (damaged) when the elevator brake pad has been nearly worn-out, as can be seen in FIG. 11. The sensor electronics will detect that the wire 36e of the sensor or alternatively wire 35e of the generator coil 35 has been damaged and immediately sent a fault ("maintenance required") signal to the dedicated signal output. This means, that when the wires 36e of the secondary coil ($L_S$) will be disrupted or cut, the impedance of the secondary coil 36, 36a, 36b will shoot-up. To have an impression: when not damaged the coil impedance is around 2 to 10 Ohms, and when disrupted or cut then it is several 100 kOhm to a few Mega Ohms. Alternatively, the wire 36e of the secondary sensing coil 36 might get short circuited to the ground-level-signal that is connected to the elevator brake disk 40. In both cases the system has a clear indication and the elevator brake unit has to initiate a signal that will stop the whole system where this elevator brake unit is installed.

Figure 12:
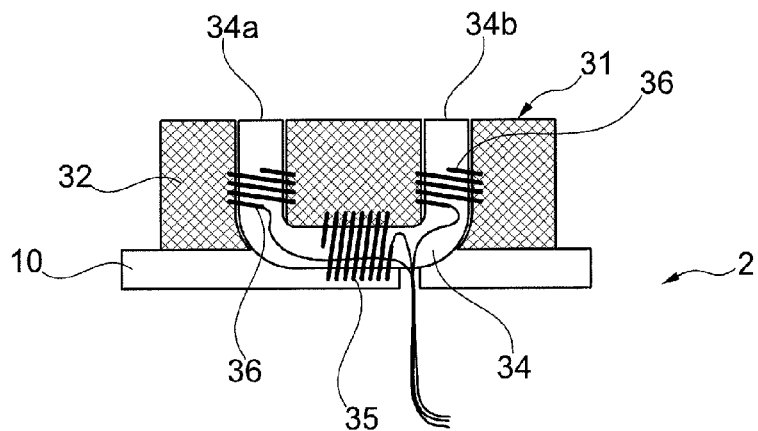
FIG. 12 illustrates an elevator brake pad according to an exemplary embodiment having embedded a flux concentrator having pole faces flush with the friction surface.

FIG. 12 illustrates an elevator brake pad having embedded the flux concentrator 34 so that the pole faces 34a, 34b are flush with the friction surface 31 of the wearing layer 32 of the elevator brake pad. This allows distance measurement between the friction surface 31 of the elevator brake pad and the friction surface 41 of the elevator brake disk or drum 40.

Figure 13:
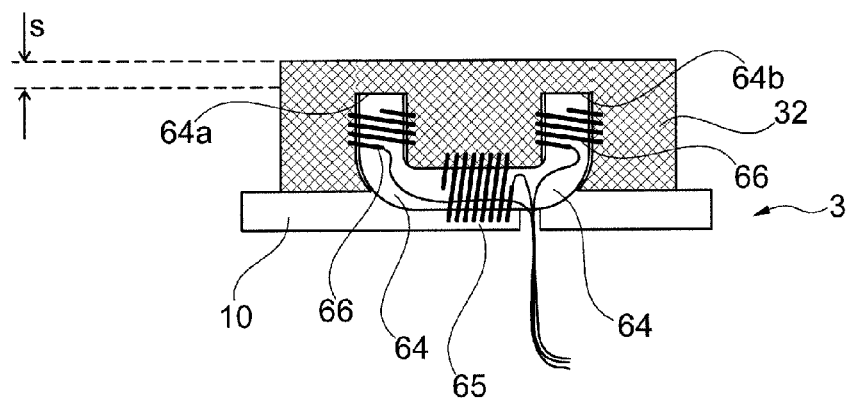
FIG. 13 illustrates an elevator brake pad according to an exemplary embodiment having embedded a flux concentrator having pole faces distant to the friction surface.

FIG. 13 illustrates an elevator brake pad having embedded the flux concentrator 64 so that the pole faces 64a, 64b are distant by the distance s with the friction surface 31 of the wearing layer 32 of the elevator brake pad. This allows distance measurement between the friction surface 31 of the elevator brake pad and the pole faces 64a, 64b, which corresponds to the maximum wear and life time.

Figure 14:
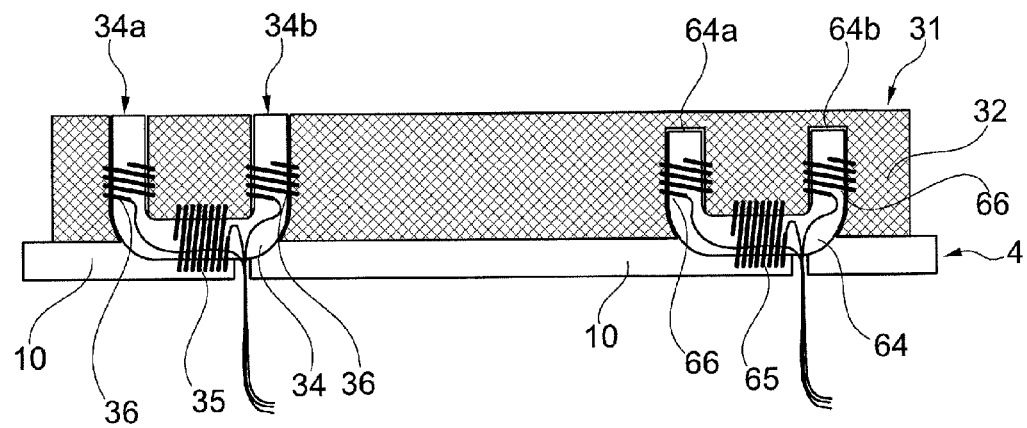
FIG. 14 illustrates an elevator brake pad according to an exemplary embodiment having embedded a flux concentrator having pole faces flush with the friction surface and a flux concentrator having pole faces distant to the friction surface.

FIG. 14 illustrates a combination of an elevator brake pad according to FIG. 12 and an elevator brake pad according to FIG. 13. In other words, the elevator brake pad of FIG. 14 includes a flux concentrator 34 being embedded in the wearing layer 32 so that the pole faces 34a, 34b are flush with the friction surface 31 of the wearing layer 32 of the elevator brake pad, as well as a flux concentrator 64 embedded in the wearing layer 32 so that the pole faces 64a, 64b are distant by the distance s with the friction surface 31 of the wearing layer 32 of the elevator brake pad. Such an elevator brake pad allows distance and force measurement between the friction surface 31 of the elevator brake pad and the friction surface 41 of the elevator brake disk or drum 40 and distance measurement between the friction surface 31 of the elevator brake pad and the pole faces 64a, 64b, which corresponds to the maximum wear and life time.

Figure 15:
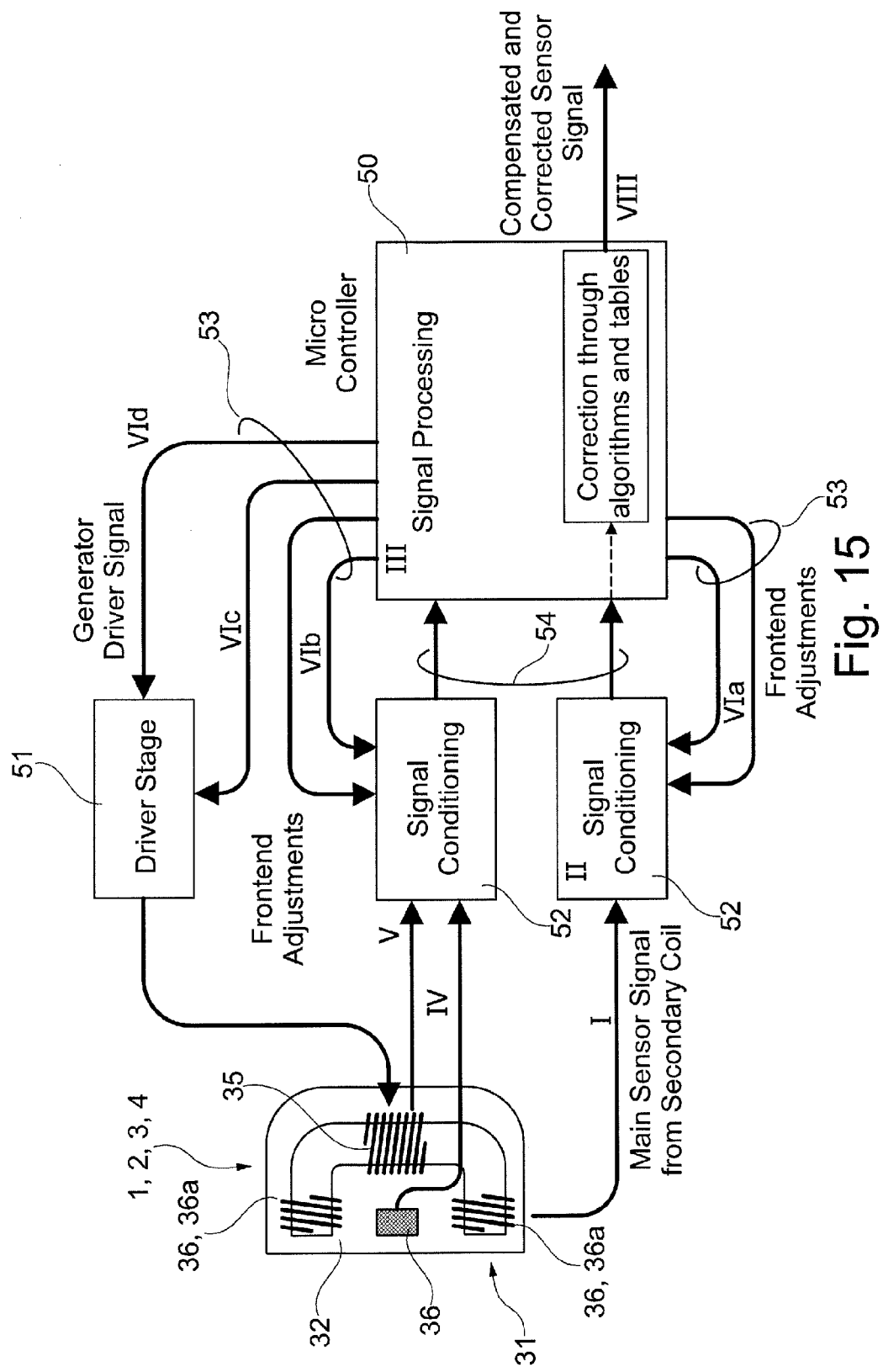
FIG. 15 illustrates the general build up of the elevator brake monitoring system.

FIG. 15 illustrates the general build up of the system. This is one example of how to design an automatic adjusting signal conditioning and signal processing electronics module. The main signal path I serves for transmitting the sensing signals to a signal conditioning unit 52 for signal conditioning II. Based on the measurements taken from the secondary sensing coil ($L_{S1}+L_{S2}$) the output signal will indicate the changes in the spacing and the applied forces to the test object 40 (not shown) etc. The signal output VIII is a result of the computation and processing III by the digital micro controller, which may be implemented into the controlling and evaluating unit 50 and having embedded an evaluation section. Additional sensor signals are collected IV, V and fed into the micro-controller 50 for analysis, for example generator signal amplitude, sensing module temperature, interference signal, and so on. The micro-controller 50 can now decide about how the automatic signal adjustments and compensations will be executed. Three possible solutions are shown in the diagram.

Option A is to re-tune and re-program the signal conditioning circuits 52 for signal conditioning II. These re-tuning adjustments will be applied to the signal conditioning circuits 52 that are responsible for signal amplifications, signal filter frequencies, signal offset, etc. These adjustments are done through dedicated control lines VIa and VIb.

Another option B is to manipulate the generator frequency VId by the driver stage 51 and the generator signal amplification VIc. This will compensate for the sensor performance changes caused by changes in the ambient temperature and when different materials are used for the test object.

The last option, C, is the signal compensation through manipulating digitally the measurement signals. Such output signal compensation and adjustment will be done entirely inside of the micro-controller device 50 and does not require any manipulation of the front-end electronics. While the last option C is the cheapest solution, it is not as effective as the other two options A and B.

When utilizing most or all the possible features, the here described sensing technology offers e.g. at least six individual electrical wires that connect the sensing module to the sensor electronics. Depending on the circumstances, theoretically it may be possible that there will be a wire breakage inside the sensing module or in the wires that connect the sensing module with the sensing electronics 50. It will be very easy and a straight forward circuit design solution to detect and recognize that the otherwise low impedance inductor connection has suddenly turned into a high impedance input (or output). In case of the secondary coil signal connection, the sensing electronics actually expects that the wire in the secondary coil loop will be cut-off eventually (indicating that the elevator brake pad has been worn-out and need replacement). The electronic circuit design that will be used to detect the expected interruption of the wire-loop, can be applied for all of the other wires (circuit loops) that are going back and forth between the sensor electronics and the sensing module.

As all the components used inside the sensing module are low impedance and passive inductors (coils), it is very easy to detect any wire breakage. In case of a wire breakage the low impedance connection between the input and output of the inductor will turn into a higher impedance connection. In case a small electrical current will be used to detect coil damage, then the voltage across the two connection of the coil will increase when the impedance (resistance) in the coil is increasing. There are also other possible solutions to detect wire breakage.

The user of the elevator brake system wants to know by when the elevator brake pads have to be replaced as they are worn down completely. Assuming that the elevator brake pads a resting at the very same location every time the elevator brakes are not in use (this location will be denoted as the "resting point" of the sensing module) then the signal amplitude of the secondary coil will change (decrease) over time, in relation to the wear-and tear of the elevator brake pad. The thinner the elevator brake pad will get the shorter the flux-concentrator ends will get as they will be worn-out as well together with the elevator brake pad. With the shortening of the flux concentrator poles, the distance d between the flux concentrator poles and the target-object will increase (when taking the distance measurement from the resting-point of the elevator brake pad). The consequence is that the signal amplitude measured at the output of the secondary coil will increase. When the secondary coil signal amplitude has dropped below a certain level then the elevator brake pad has been worn-out and needs replacing. Ignoring this signal and keep going to use the elevator brake pad eventually will result in that the wire of the secondary coil will be torn apart (shredded) as the elevator brake pad has become very thin now. At that point the elevator brakes are no longer safe to be used and the entire mechanical structure (of which the elevator brakes are part of) has to be deactivated.

The signal transfer function (between the primary to secondary coil) is dependent on several factors. Either theses influencing factors of the transfer function are kept constant, or, when this may not be possible, then they have to be measured and their effects have to be compensated for. Otherwise the output signal amplitude will change when the influencing factors will change. These effects can be compensated for automatically or can be adjusted manually, for example. Some of these transfer-function influencing factors are:

Operating temperature
Ferromagnetic material composition of the test-object
Surface quality and surface condition from both, the test-object and the poles of the flux gate.
Roughness of the surface
Hardening process applied to the surface
Signal frequency with which the generator coil (LG) is driven
Signal amplitude with which the generator coil (LG) is driven
Parallel or non-parallel movements between the test-object and the flux concentrator
The two objects might be tilted towards each other
Metallic objects that are placed nearby (very very close by!)
Objects with ferromagnetic properties
Objects with electric conductivity properties
Waste material (or other materials) that are collected around the sensor system during the system operation,
Dust, dirt, particles of conductive materials
EMI (Electro Magnetic Interferences) that is using the same operational frequency as the AC signal driven primary and secondary coil signal path.

There are a number of different options to choose from about how to compensate for the unwanted effects caused by interfering signals or environmental condition changes.

The key benefits and special features of this sensor system solution are:

Very robust design, by using passive electrical components that will withstand even very high operating temperatures.

One basic sensing system design is capable to provide the answers to a large set of physical parameter questions: Very low design complexity, small in space, and low in cost.

Allows real-time (fast) measurements.

Non-Contact Sensing solution that does not require any changes to an already existing elevator brake system (test-object). Nothing will be attached to any rotating mechanical part (test-object).

Ideal for retrofitting into elevator brake system that are even several decades old (when trying to update older equipment).

Very easy to repair and to maintain as the key sensor part sits inside a consumable device that need replacing anyway.

Can even detect and quantify the mechanical forces with which the elevator brake-pads are actually pressed against a stationary or rotating test-object (elevator brake disk, elevator brake drum, or linear moving device).

The sensor system will continue to operate and function even when the surface of the test-object is covered under a coat of paint, is slightly rusty, or is covered by a coat of other electrically insulating material like an oil film, for example (limits do apply).

Can be used in rotating disk/drum based elevator brake systems and inn linear moving (sliding) elevator brake systems.

The sensing module can be designed and built to meet the dimensional requirements for large and small elevator brake systems. There is almost no mechanical limitation about how large or how small the sensing module can be (like, ranging from 5 mm by 12 mm to 15 mm to 40 mm or more for the face plate, as an example). This sensing technology is very scalable in its mechanical dimensions.

Novel features of this sensor system innovation are

Using magnetic physical principles or magnetic dependent physical phenomena's to measure mechanical forces, distances, motions and speed, and operating temperatures, all with the same basic sensor structure.

Using changes in the magnetic transfer function (between primary and secondary coil) to identify and quantify the mechanical forces (in Newton per cm2) with which the sensor device (sensing module) is pressed against a test-object.

Works with any test-object as long as the material from which the test-object has been tooled has magnetic properties.

The sensor system can be applied to rotating and linear moving test-object in the same way as the sensing module is placed inside the stationary (not rotating) elevator brake pads.

The key component of the sensor system is installed (will be placed or is part of the elevator brake pad itself).

The ferromagnetic core of the sensing module is tooled from relative soft material that is wearing out at a similar rate as the elevator brake pads will wear out (consumable part).

The sensing module will be replaced together with the elevator brake pad and therefore always "new". This means that this type of elevator brake function monitoring system can be used over a very long time (as long as the elevator brake pads will be replaced when advised).

As a magnetic field sensing device (like for the secondary coil function), almost any type of magnetic field sensor can be used, including (but not limited to): Hall-effect, MR, and GMR.

By changing the operational frequency and the signal amplitude of the primary coil signal driver, the signal transfer function can be optimized and adapted for different types of alloy used in the target-object. This way this type of sensor system solution can maintain its performance and efficiency even when used and applied to different type of target-objects.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

REFERENCE LIST 1 elevator brake
2 elevator brake pad with flushing pole faces
3 elevator brake pad with distant pole faces
4 elevator brake pad with combined flushing and distant pole faces
10 chassis structure
20 moving structure
30 first element
31 first friction surface
32 wearing layer
34 flux concentrator, first flux concentrator
34a first pole face
34b second pole face
34c first yoke leg
34d second yoke leg
35 magnetic field generating arrangement
35a magnetic field generating coil
35e signal wire, driving wire of magnetic field generating arrangement
36 magnetic field sensing arrangement
36a first magnetic field sensing coil, second feedback coil
36b second magnetic field sensing coil, second feedback coil
36e signal wire of magnetic field sensing arrangement
40 second element
41 second friction surface
50 controlling and evaluation unit
51 drive stage
52 signal conditioning
53 controlling section
54 evaluation section
64 flux concentrator, second flux concentrator
64a first pole face
64b second pole face
64c first yoke leg
64d second yoke leg
65 magnetic field generating arrangement
65a magnetic field generating coil
65e signal wire, driving wire of magnetic field generating arrangement
66 magnetic field sensing arrangement
66a first magnetic field sensing coil, second feedback coil
66b second magnetic field sensing coil, second feedback coil
66e signal wire of magnetic field sensing arrangement In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator brake comprising:
   a fixed part;
   a moving part being movable relative to the fixed part;
   a first element having a first friction surface; a second element having a second friction surface;
   a controlling and evaluation unit;
   wherein a fixed part element, being one of the first element and the second element, is movably mounted to the fixed part and a moving part element, being another of the first element and the second element, is mounted to the moving part, wherein the fixed part element is configured to move the first friction surface toward and into contact with the second friction surface;
   wherein at least one of the first element and the second element comprises:
   a wearing layer having an associated one of the first and second friction surfaces,
   a magnetic field generating arrangement,
   a magnetic field sensing arrangement,
   wherein the controlling and evaluating unit is adapted to drive the magnetic field generating arrangement to generate a magnetic flux in the wearing layer, and the controlling and evaluating unit is adapted to determine a mechanical force applied between the wearing layer and the other of the first and second friction surfaces based on a signal received from the magnetic field sensing arrangement, and
   wherein at least one of a driving wire of the magnetic field generating arrangement and a signal wire of the magnetic field sensing arrangement is arranged within the wearing layer, such that when arriving at a maximum abrasion of the wearing layer, the at least one of a driving wire of the magnetic field generating arrangement and a signal wire of the magnetic field sensing arrangement is interrupted by abrasion.

2. The elevator brake according to claim 1 wherein at least a part of the flux concentrator is arranged within the wearing layer, wherein at least one pole face of the flux concentrator is distant to a friction surface of the wearing layer at least until arriving at a maximum wear of the wearing layer.

3. The elevator brake according to claim 1 wherein the at least one of the first element and the second element includes a flux concentrator and the magnetic field generating arrangement includes a magnetic field generating coil arrangement wound around the flux concentrator, and wherein the controlling and evaluation unit is adapted to drive the magnetic field generating coil arrangement to generate a magnetic flux in the flux concentrator.

4. The elevator brake according to claim 3 wherein the magnetic field sensing arrangement includes a sensing coil arrangement wound around the flux concentrator.

5. The elevator brake according to claim 3 wherein the flux concentrator is a yoke having a first leg and a second leg, wherein the sensing coil arrangement includes a first feedback coil wound around the first leg of the flux concentrator and a second feedback coil wound around the second leg of the flux concentrator.

6. The elevator brake according to claim 3 wherein the flux concentrator is made of a material having an abrasion property, so that the flux concentrator and a material of the wearing layer abrade correspondingly.

7. The elevator brake according to claim 3 wherein at least a part of the flux concentrator is arranged within the wearing layer, wherein at least one pole face of the flux concentrator is flush with the friction surface of at least one of the first element and the second element, wherein the friction surface of another of the first element and the second element includes a ferromagnetic surface facing at least one pole face of the flux concentrator.

8. The elevator brake according to claim 7 wherein the controlling and evaluating unit is adapted to determine a mechanical force perpendicularly acting in relation to and between the friction surface of the at least one of the first element and the second element and the friction surface of the other one of the first element and the second element based on a signal strength received from the magnetic field sensing arrangement.

9. The elevator brake according to claim 1, further comprising:
   a flux concentrator at least partially arranged within the wearing layer,
   wherein the magnetic field generating arrangement is a coil wound around the flux concentrator,
   wherein the magnetic field sensing arrangement is a coil wound around the flux concentrator,
   wherein at least one pole face of the flux concentrator is flush with the respective friction surface of the one of the first element and the second element, and
   wherein at least the other of the first element and the second element includes a ferromagnetic surface as the friction surface facing at least one pole face of the flux concentrator.

10. The elevator brake according to claim 9 wherein at least one of the first element and the second element comprises:
    a second flux concentrator at least partially arranged within the wearing layer;
    a second magnetic field generating coil arrangement wound around the second flux concentrator;
    a second magnetic field sensing coil arrangement wound around the second flux concentrator;
    wherein at least one pole face of the second flux concentrator is distant to a respective friction surface of the at least one of the first element and the second element;
    wherein the other of the first element and the second element includes a ferromagnetic surface as the friction surface facing at least one pole face of the second flux concentrator;
    wherein the controlling and evaluating unit is adapted to drive the second magnetic field generating coil arrangement to generate a magnetic flux in the second flux concentrator;
    wherein the controlling and evaluating unit is adapted to determine upon contact of the first friction surface and the second friction surface the distance between the at least one pole face of the second flux concentrator and the friction surface of the other of the first element and the second element based on a signal received from the second magnetic field sensing arrangement.

11. An elevator brake pad for use in an elevator brake according to claim 1, the brake pad comprising:
    the wearing layer with the friction surface;
    a flux concentrator at least partially arranged within the wearing layer;
    the magnetic field generating arrangement as a coil wound around the flux concentrator;

wherein at least one pole face of the flux concentrator is flush with the friction surface.

12. The elevator brake pad according to claim 11 wherein the wear layer includes an element being eminent for determining the wear layer condition, wherein the element eminent for determining the wear layer condition is arranged such that when arriving at a maximum abrasion of the wearing layer, the element eminent for determining the wear layer condition is abraded such that end of lifetime of the elevator brake pad can be detected by failure of determining the condition of the wearing layer.

13. An elevator brake pad for use in an elevator brake according to claim 1, the brake pad comprising:
the wearing layer with the friction surface;
a flux concentrator at least partially arranged within the wearing layer;
the magnetic field generating arrangement as a coil wound around the flux concentrator;

wherein at least one pole face of the flux concentrator is distant to the friction surface.

14. An elevator brake pad for use in an elevator brake according to claim 1, the brake pad comprising:
the wearing layer with the friction surface;
a first flux concentrator at least partially arranged within the wearing layer;
a first magnetic field generating arrangement as a coil wound around the first flux concentrator;
a second flux concentrator at least partially arranged within the wearing layer;
a second magnetic field generating coil arrangement wound around the second flux concentrator;
wherein at least one pole face of the first flux concentrator is flush with the friction surface;
wherein at least one pole face of the second flux concentrator is distant to the friction surface.

* * * * *